United States Patent
Simons

(10) Patent No.: US 6,600,111 B2
(45) Date of Patent: Jul. 29, 2003

(54) PORTABLE WEIGH SCALE SYSTEM FOR USE WITH VEHICLES HAVING LIFT TRUCK FORKS OR THE LIKE

(76) Inventor: Gerald S. Simons, 6 Forest Laneway, Toronto, Ontario (CA), M2N5X9

( * ) Notice: Subject to any disclaimer, the term of this patent is extended or adjusted under 35 U.S.C. 154(b) by 86 days.

(21) Appl. No.: 09/903,658

(22) Filed: Jul. 13, 2001

(65) Prior Publication Data

US 2003/0010542 A1 Jan. 16, 2003

(51) Int. Cl.[7] .............................................. G01G 19/08
(52) U.S. Cl. ......................................................... 177/139
(58) Field of Search ................................. 177/136–141

(56) References Cited

U.S. PATENT DOCUMENTS

| | | | |
|---|---|---|---|
| 4,420,053 A | * 12/1983 | Russo | 177/139 |
| 4,638,876 A | 1/1987 | Balduin et al. | 177/139 |
| 4,666,004 A | * 5/1987 | Raz | 177/139 |
| 4,714,122 A | * 12/1987 | Appleton et al. | 177/139 |
| 4,854,406 A | * 8/1989 | Appleton et al. | 177/139 |
| 4,899,840 A | * 2/1990 | Boubille | 177/139 |
| 5,417,536 A | * 5/1995 | Cech | 177/140 |
| 5,739,478 A | 4/1998 | Zefira | 177/130 |
| 5,922,998 A | * 7/1999 | Zefira | 177/136 |
| 5,986,560 A | * 11/1999 | Rayburn | 177/136 |
| 6,002,090 A | * 12/1999 | Johnson et al. | 177/136 |

* cited by examiner

Primary Examiner—Randy Gibson

(57) ABSTRACT

A portable weigh scale system that can be easily fitted onto the standard forks of a lift truck or the like for lifting, weighing and transporting a load without modifications to the vehicle or lift forks. The weigh scale assembly is principally constructed from fabricated standard metal tubing sections, a fabricated metal attachment and load sensing cells that, as an assembly, can be configured in a number of ways to better suit different load transport and weighing applications. The load sensing cells that fit between and are protected by a fabricated metal and tubing section are affixed to these with fasteners fitted through spacers. The top length of the assembly provides a load bearing surface that interfaces through the spacers, fabricated metal attachment, tubing sections and load sensing cells to provide accurate load weight data. The weigh scale assembly is comprised of two identical halves to form a pair that can be affixed together along their length if preferred. The said assembly relays load weight data through routed wiring connecting the load sensing cells to an electronic readout appropriately positioned near the operator. The design of the components and method of their assembly result in improved manufacturing efficiency and cost effectiveness, ease of installation and removal, improved load weighing versatility, compactness, lighter weight, portability and easier servicing.

13 Claims, 14 Drawing Sheets

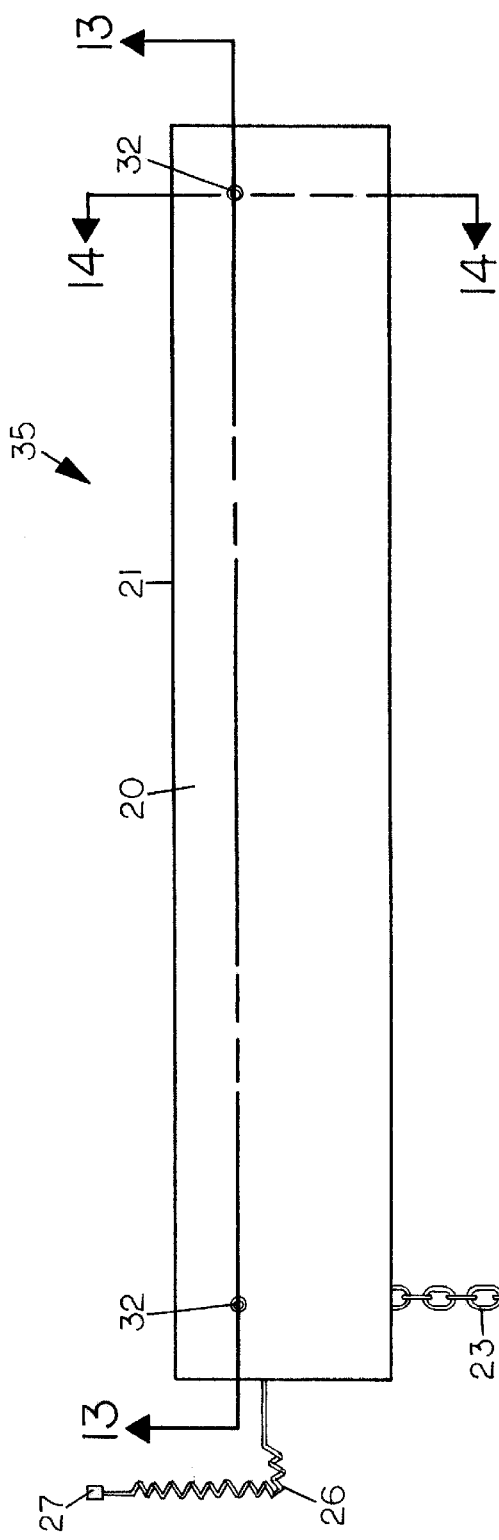
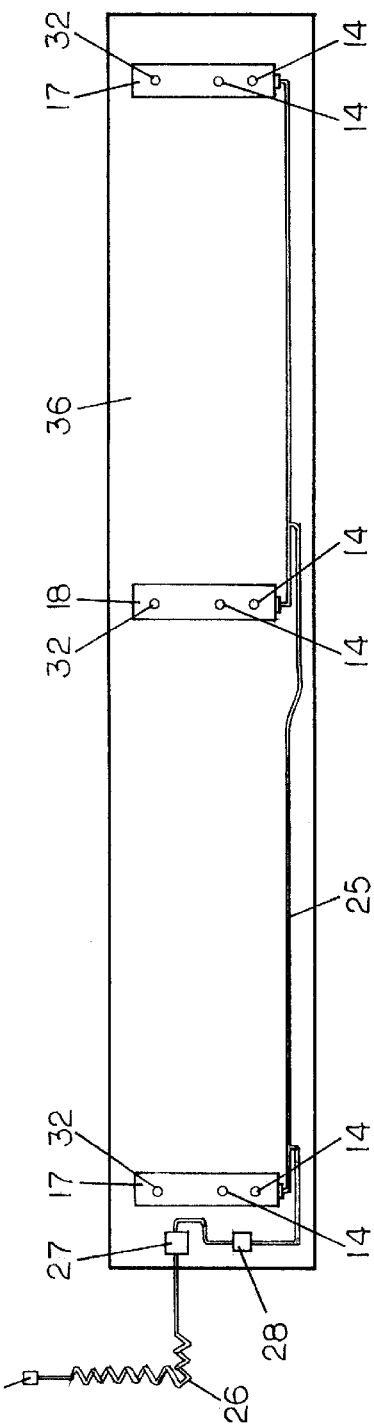
FIG 12a
FIG 12b

PORTABLE WEIGH SCALE SYSTEM FOR USE WITH VEHICLES HAVING LIFT TRUCK FORKS OR THE LIKE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention relates in general to electrical/ electronic weighing systems and more particularly to portable weigh scales incorporating strain gauge load cells used on forklift trucks and the like.

There are a number of related patented weighing systems that to varying degrees of effectiveness, enable forklift trucks and the like to perform weighing functions in addition to typical lifting and transporting functions. However, with regard to aspects such as portability, accurately weighing certain load types, lifting functions, manufacturing costs, installation, removal and servicing, these prior art systems can encounter specific problems.

Some of these system designs are not based on or suited for being fitted to standard lift truck forks and therefore tend to require more custom manufactured components and complexity as evident in U.S. Patent to Boubille, U.S. Pat. No. 4,899,840 and Balduin et al., U.S. Pat. No. 4,638,876. The use of custom manufactured components and increased design complexity usually result in higher manufacturing costs and requiring more highly skilled or knowledgeable service personnel.

Some of these system designs require structural modifications or additional attachments to the lift truck carriage assembly, adding cost and resulting in more difficult and time consuming installation and removal as evident in U.S. Patent to Johnson et al., U.S. Pat. No. 6,002,090. Further, the addition of weigh system components such as a secondary carriage can potentially obscure operator vision of the load and create a potentially unbalanced and unsafe condition because the position of the lift forks is moved forward relative to the lift truck resulting in incorrect load centers as specified by the lift truck manufacturer.

Some of these system designs are limited with regard to ease of performing weighing functions in that they must be activated into the lift mode before weighing functions can be performed as evident in U.S. Patent to Zefira, U.S. Pat. No. 5,739,478. The weight of the load cannot be measured by just placing the load on the lifting surface of the weigh system. Further, because weighing functions cannot be performed with the lifting surface in the fully lowered position, it is difficult or impossible to safely check the load weight relative to the maximum lifting capacity of the lift truck or the like before attempting to lift the load.

Some of these systems do not utilize the entire lifting surface for weighing, making the specific placement of certain loads more critical for this purpose as evident in U.S. Pat. to Russo, U.S. Patent No. 4,420,053.

Some of these systems employ mechanically elaborate designs, more likely to be prone to mechanical malfunction and entail higher manufacturing cost to address weight measurement accuracy problems resulting from eccentric loads as evident in U.S. Patent to Balduin et al., U.S. Pat. No. 4,638,876.

Some of these systems have irregular or stepped lifting surfaces that could cause binding while attempting to slide the weighing system under a standard pallet or the like as evident in U.S. Patent to Boubille, U.S. Pat. No. 4,899,840.

Electronic weigh systems fitted to forklift trucks and the like tend to be bulky and heavy assemblies that are either integral with the equipment they are used on, or affixed to such equipment in a way that makes portability, ease of installation and removal of such systems difficult. Further, it is also difficult to optimize the lifting, transport and weighing functionality of lift truck equipment and the like for a wider range of load types with just one weigh scale design configuration. For instance, to optimize the weighing accuracy for a load such as a flat sheet steel coil, that is cylindrical in shape, the weight of the coil must be centered as close as possible over the load sensing cells. The typical relative position of contact points between the inside diameter of such a load and prior art forklift weigh sensing scales prevent such centering.

BRIEF SUMMARY OF THE INVENTION

A cost effective portable weigh scale system comprised of various preferred interchangeable design configuration options that can be easily serviced, fitted to and removed from the standard lift forks of lift truck vehicles or the like increasing the functional range of such vehicles without requiring their modification. Each design configuration of the said weigh scale system is generally constructed of standard metal tubing sections, a fabricated metal attachment and load sensing cells that are affixed together with fasteners fitted through spacers. When a load is placed or fitted onto the top surfaces of the said weigh scale system, the load sensing cells elastically flex, transmitting load weight readings through a wiring system to a commercial display mounted suitably near the operator.

It is an object of the present invention to provide a versatile, low to high weighing capacity, portable, compact and lighter weight weigh scale system with easily interchangeable design configuration options better suited to the lifting and accurate weighing of a wider range of load types. This includes cylindrical loads such as flat sheet steel coil, in addition to lifting, weighing and transport functions in more general applications.

It is another object of the present invention that it can be fitted to standard lift truck forks without modification to the lift truck or its forks.

It is a further object of the present invention that it's assembly with and removal from lift truck forks be easy, facilitating quick conversion between cylindrical load and standard applications with the same lift truck forks.

A feature of the present invention is that it can be fitted onto standard lift truck forks without the need for modifications to the lift truck or its forks.

Another feature of the present invention is that it is primarily constructed from standard tubing sections, simple sheet metal forms and load sensing cells to form an assembly that minimizes the requirement for extensive custom manufacturing and therefore maximizes cost savings.

Another feature of the present invention is that its compact size, lighter weight construction, simple slide on/off design for standard lift truck forks and the elimination of required modifications to the lift truck and its forks, facilitates ease of installation and removal as well as portability of this design.

Another feature of the present invention is that because of its design simplicity and ability to be easily fitted onto and removed from standard lift truck forks, servicing by technicians without highly specialized knowledge and skills is facilitated. Further, this design simplicity facilitates the convenience of servicing onsite, saving the additional time and money required for servicing offsite by specialists.

Another feature of the present invention is that load sensing cell overload protection is accomplished by means of simple load sensing cell, weigh scale assembly component and lift fork proximity arrangements. By limiting load sensing cell movement and direct exposure to external objects, these arrangements limit load cell flexure to within its operable limits and prevent possible load sensing cell damage from high impact.

Another feature of the present invention is that additional attachment components such as a secondary carriage for mounting the forks to the lift truck are not required. Therefore the position of the forks is kept safely at the distance from the lift truck specified by the manufacturer, thus maintaining proper balance between the forks and the truck for lifting, weighing and transporting functions. Further, operator vision of a load is not potentially obscured by said additional attachment components.

Another feature of the present invention is that it provides easily interchangeable design configuration options better suited to the lifting and accurate weighing of a wider range of load types including flat sheet steel coil, in addition to lifting, weighing and transport functions in more general applications.

Another feature of the present invention is that a weigh scale configuration can be selected to perform weighing functions with the lift forks in the fully lowered position. As a result, load weight can be safely checked relative to the maximum lifting capacity of the lift truck before attempting to lift the load, thus avoiding potential injury to the operator and damage to the lift truck.

Another feature of the present invention is that a low profile weigh scale configuration can be selected to allow easy access of the lift forks and weigh scale under standard pallets.

Another feature of the present invention is that the entire lifting top surface can be utilized for weighing.

Another feature of the present invention is that the load sensing cells are electronically matched to transmit accurate weight data regardless of the positioning of the load on the lift forks and weigh system assembly.

Another feature of the present invention is that its simple slide on/off assembly with standard lift truck forks, optional design configurations, compactness and lighter weight facilitate quick and easy conversion of standard lift truck forks for various uses. These uses can include use for general lifting and transport functions as well as use for accurately weighing a wider range of load types that can include cylindrical loads such as flat sheet steel coil. This feature thus expands the effective range of application of unmodified standard lift truck forks.

Another feature of the present invention is its implementation of auxiliary load sensing cells to reinforce the structural integrity of the design. Such reinforcement prevents potential convex and concave deformation in the center section of this weigh scale system while under load and augments the weighing capacity of the primary load sensing cells. This feature facilitates the higher weigh scale registration capacity required for heavier loads, and without overloading the primary load sensing cells or significantly increasing the bulk or cost of the system.

Another feature of the present invention is that the auxiliary load sensing cells are not affixed to the upper or top components of the weigh scale assembly. This eliminates weighing errors resulting from the potential binding action caused by utilizing more than two load sensing cells to sense load weight and transmit weight readings.

Another feature of the present invention is the implementation of a stretchable extension cable and end fittings that function as an inexpensive interconnect between the weigh sensing system and a digital weight readout display mounted appropriately near the operator. The stretchable extension cable enhances resistance to damage if it is inadvertently pulled. The simple, easy to use plug-in end fittings facilitate quick and easy no-tool connection and disconnection of the weigh scale system to and from the lift truck weight readout display for servicing or other lift truck functions.

DESCRIPTION OF THE DRAWINGS

FIG. 12a is a top view of half of the fully assembled portable weigh scale system according to a fourth preferred embodiment of the present invention.

FIG. 12b is a top view of half of the partially assembled portable weigh scale system without the outer tubing subassembly according to a fourth preferred embodiment of the present invention.

DETAILED DESCRIPTION OF PREFERRED EMBODIMENTS

Figure 1:
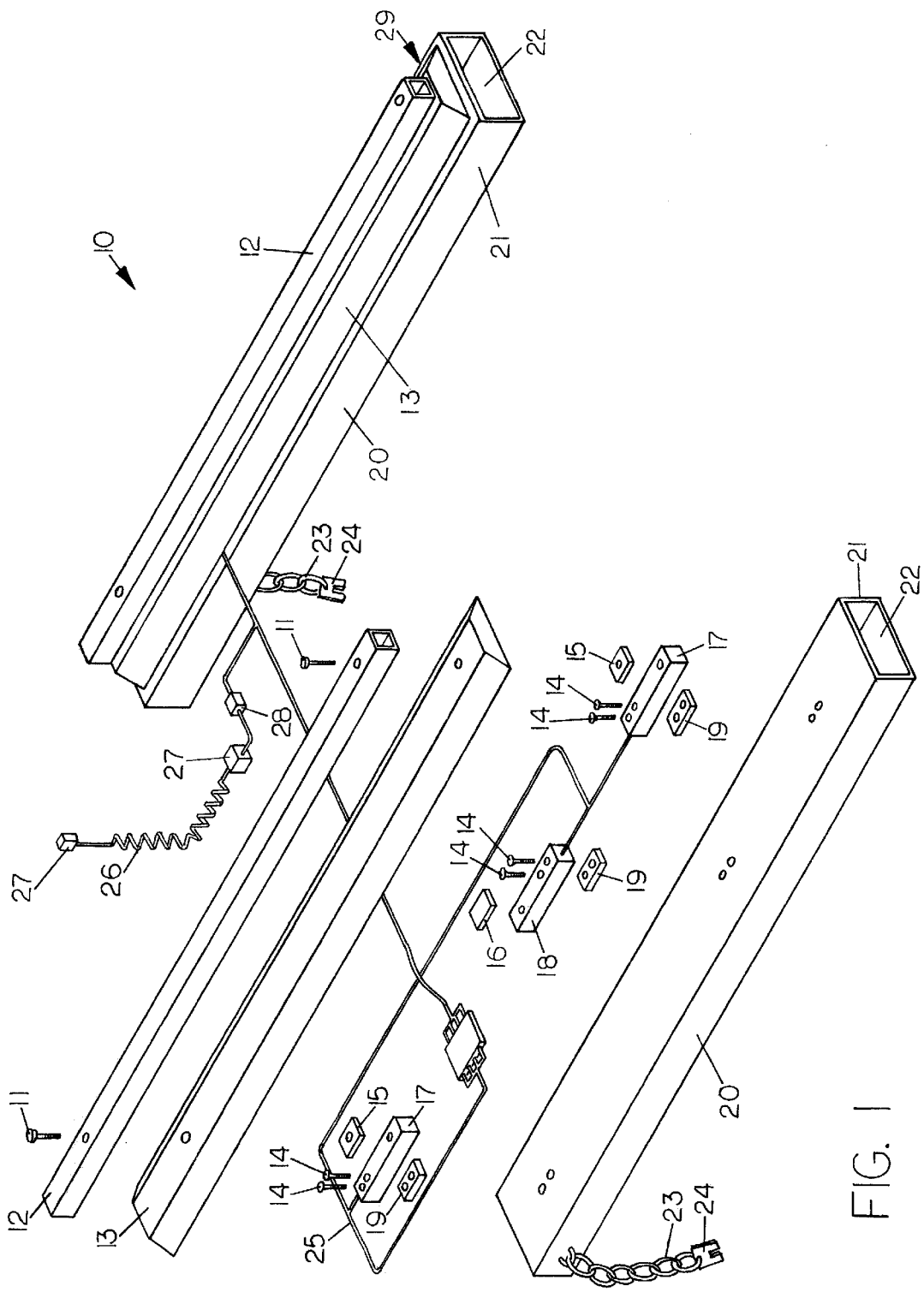
FIG. 1 is an exploded view of the portable weigh scale system according to a preferred embodiment of the present invention.
Figure 2:
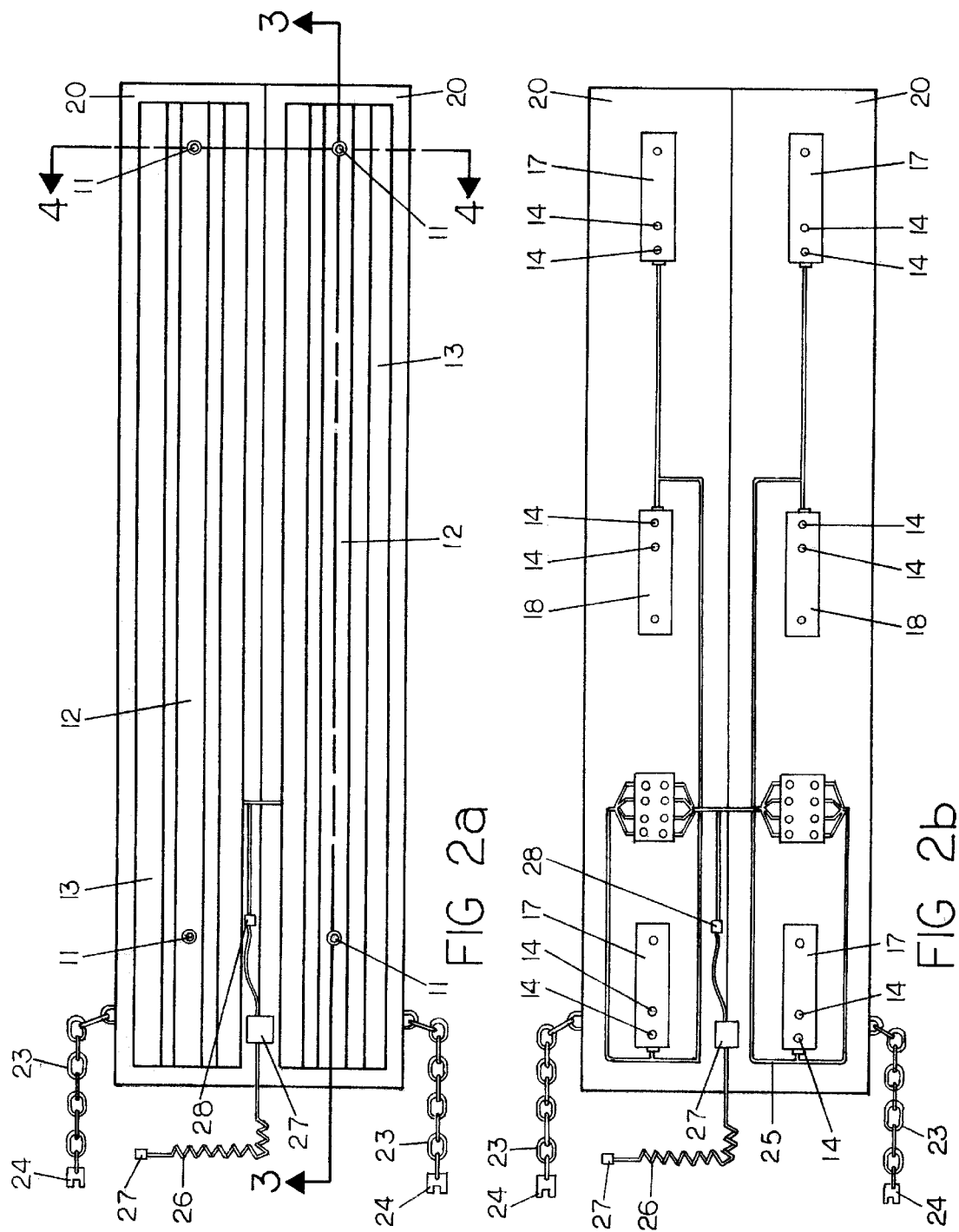
FIG. 2a is a top view of the fully assembled portable weigh scale system according to a preferred embodiment of the present invention.
FIG. 2b is a top view of the partially assembled portable weigh scale system without the upper component subassembly according to a preferred embodiment of the present invention.
Figure 3:
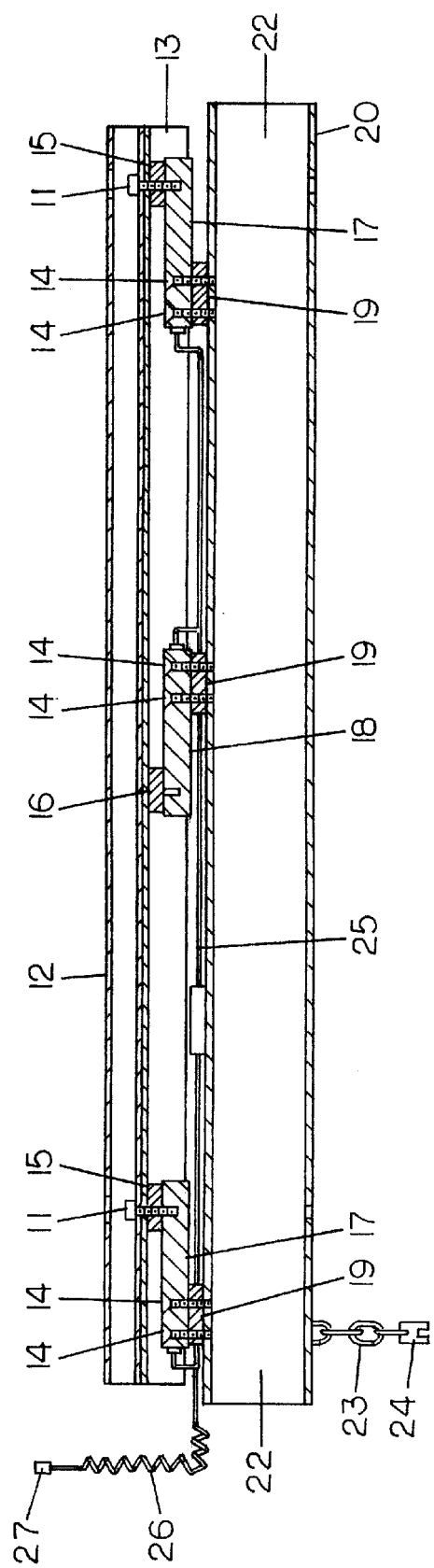
FIG. 3 is a full-length sectional view of half of the fully assembled portable weigh scale system taken along line 3—3 of FIG. 2a according to a preferred embodiment of the present invention.
Figure 4A:
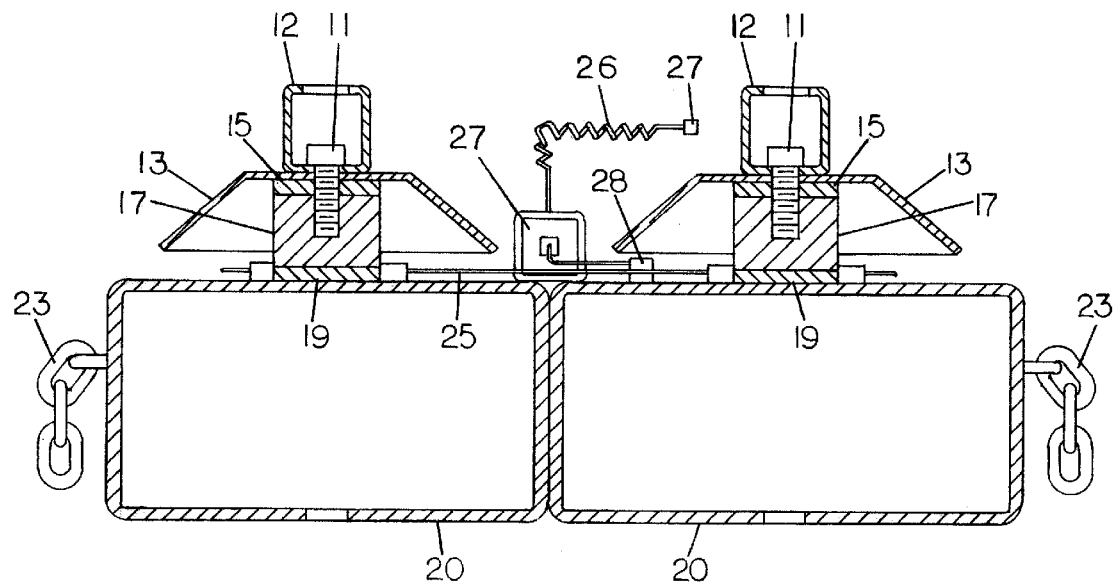
FIG. 4a is a full-width enlarged sectional view of the fully assembled portable weigh scale system taken along line 4—4 of FIG. 2a according to a preferred embodiment of the present invention.
Figure 4B:
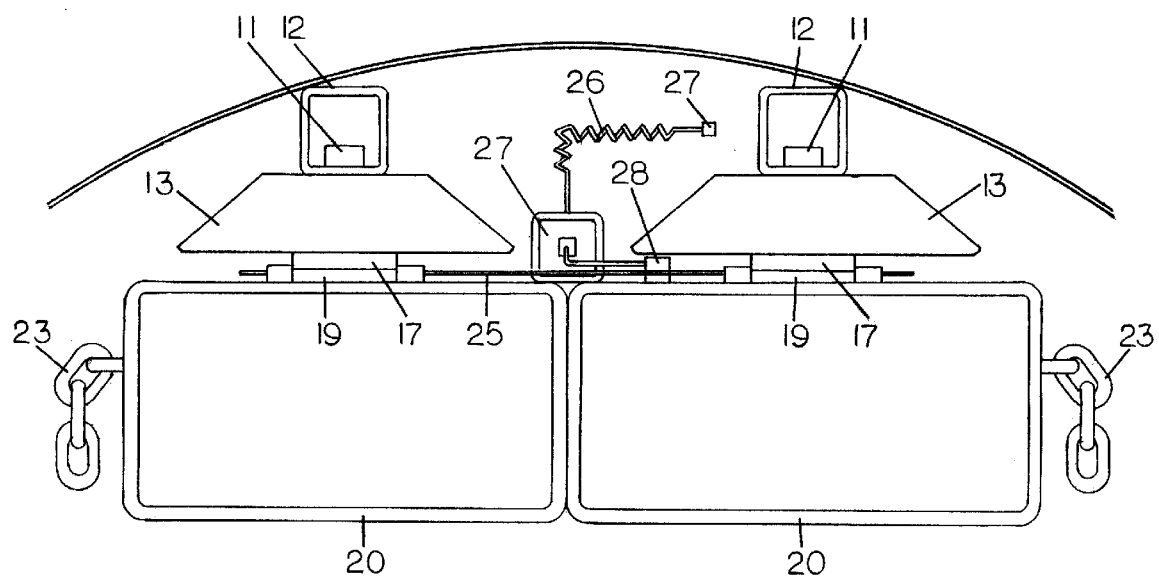
FIG. 4b is a full-width enlarged end view of the fully assembled portable weigh scale system with an arc representing the superior centering of the inner diameter of a cylindrical load directly over the load sensing cells according to a preferred embodiment of the present invention.

Illustrated in FIGS. 1–5b is a portable weigh scale system for use with vehicles having lift truck forks and the like. FIG. 1 illustrates the said portable weigh scale system assembly 10 depicting all components according to a preferred embodiment of the present invention. The said weigh scale system is comprised of two identical halves to form a pair that can be affixed together at surfaces 21 if preferred. One half of the system 29 is shown fully assembled. Each half of the said pair includes an upper fabricated standard metal tubing section 12 attached by fasteners 11 to a fabricated metal cover 13. The metal cover 13 fits over primary load sensing cells 17 and any required number of auxiliary load sensing cell or cells 18. The primary load sensing cells are affixed to the fabricated metal cover 13 and the standard formed metal tubing section 12 by fasteners 11 through spacers 15 as illustrated in FIGS. 2b and 3. These primary load sensing cells are further affixed to a lower standard formed metal tubing section 20 by fasteners 14 through spacers 19. The auxiliary load sensing cell or cells 18 is not affixed but positioned against the upper inside surface of fabricated metal cover 13 with spacer 16 that is affixed to each auxiliary load sensing cell. This auxiliary load sensing cell or cells is affixed to the standard formed metal tubing section 20 by fasteners 14 through spacer or spacers 19.

Each half of the said weigh scale system pair is electrically interconnected by a wiring system 25 that is routed to a commercial electronic readout display through a common interconnect subassembly comprised of a stretchable extension cable 26 and end fittings 27 and 28. The electronic readout is suitably mounted near the operator position of a lift truck or the like. Once fitted over lift truck forks or the like through openings 22, each half of the said weigh scale system is attached by means of a flexible line or chain 23 and connecting bracket 24 to a fork lift truck or the like.

Figure 5A:
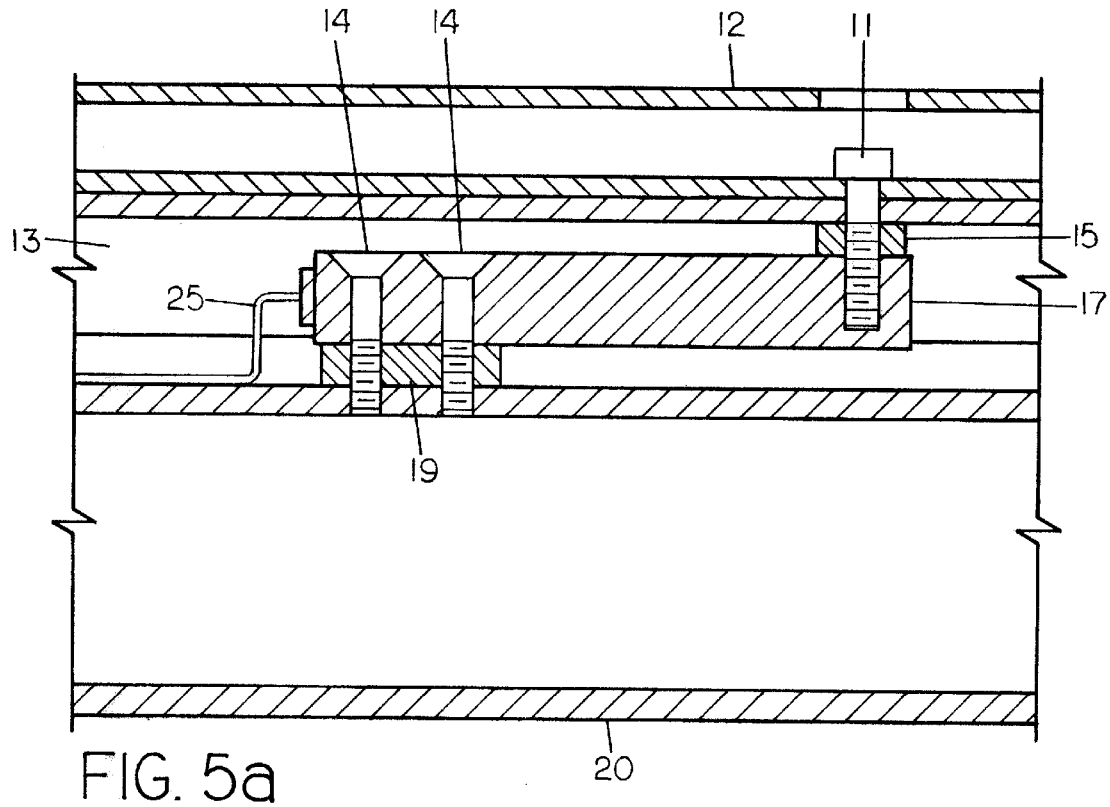
FIG. 5a is an enlarged fragmentary view of a portable weigh scale system primary load sensing cell subassembly at rest according to the present invention.
Figure 5B:
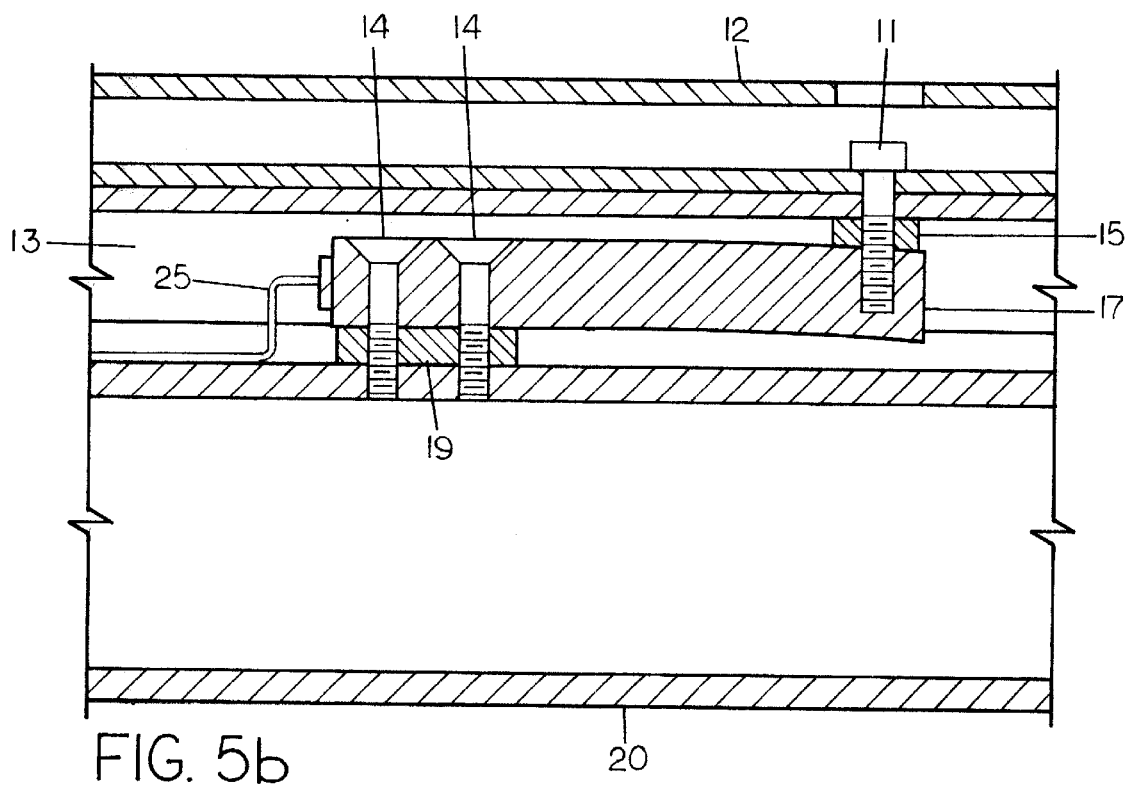
FIG. 5b is an enlarged fragmentary view of a portable weigh scale system primary load sensing cell subassembly under load according to the present invention.

Lifting, weighing and transport functions of the above described assembly embodiment 10 of this invention illustrated in FIGS. 1–5b, are especially well suited to cylindrical loads such as flat sheet steel coil. An arc representing the inner diameter of a cylindrical load and the superior centering of such a load weight directly over the load sensing cells required to optimize weight reading accuracy is illustrated in FIG. 4b. The inner diameter of the said load contacts the fabricated standard metal tubing sections 12. When the load is lifted, or simply placed on to the top surface of the said weigh scale system 10, the metal tubing sections 12 and fabricated metal covers 13 depress downwards, elastically bending the ends of the load sensing cells 17 and 18 towards the top surface of metal tubing sections 20 as illustrated in FIGS. 5a and 5b. This action generates a weight reading that is transmitted to an electronic readout display. Vertical overload protection is achieved because the downward flexing of primary load sensing cells 17 and auxiliary load sensing cells 18 will bottom them out on the top surface of metal tubing sections 20 preventing further flexing of all load sensing cells before they reach their operational load weight limit. This is accomplished by providing the correct spacing between all load sensing cells and the top surface of metal tubing sections 20. Lateral overload protection is achieved because all load sensing cells are protected by the metal covers 13 and the metal tubing sections 20. The proximity of the said covers and tubing sections relative to the said load sensing cells, ensures that the said covers and tubing sections will impact laterally with another object before such an object can contact the load sensing cells. Further, the standard lift truck fork tips extend slightly past metal tubing sections 20 through openings 22 and will laterally impact with another object before such an object can contact weigh scale system assembly 10. Potential binding within the said weigh scale system caused by the use of more than two load cells that could affect weight measurement accuracy is eliminated by affixing only the primary load sensing cells 17 to the load-reactive metal covers 13 and metal tubing sections 12 by means of fasteners 11 as illustrated in FIG. 3. The auxiliary load sensing cells 18 are attached only to the top surface of the metal tubing sections 20 that are not load-reactive as illustrated in FIG. 3.

Figure 6A:
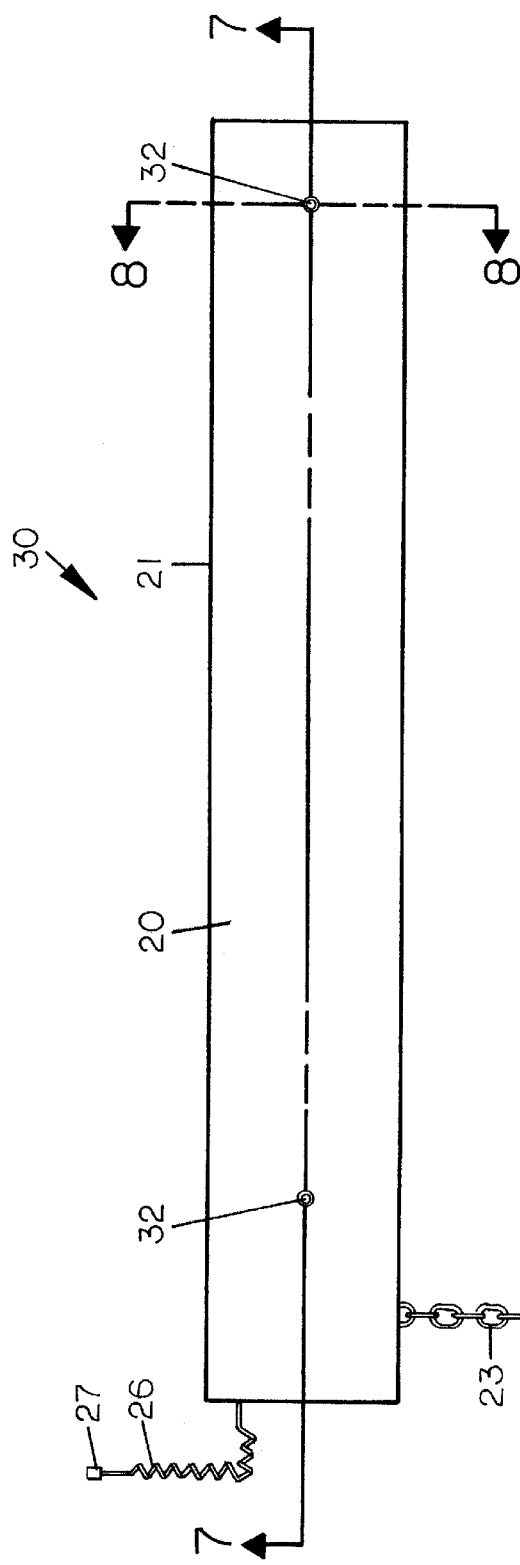
FIG. 6a is a top view of half of the fully assembled portable weigh scale system according to a second preferred embodiment of the present invention.
Figure 6B:
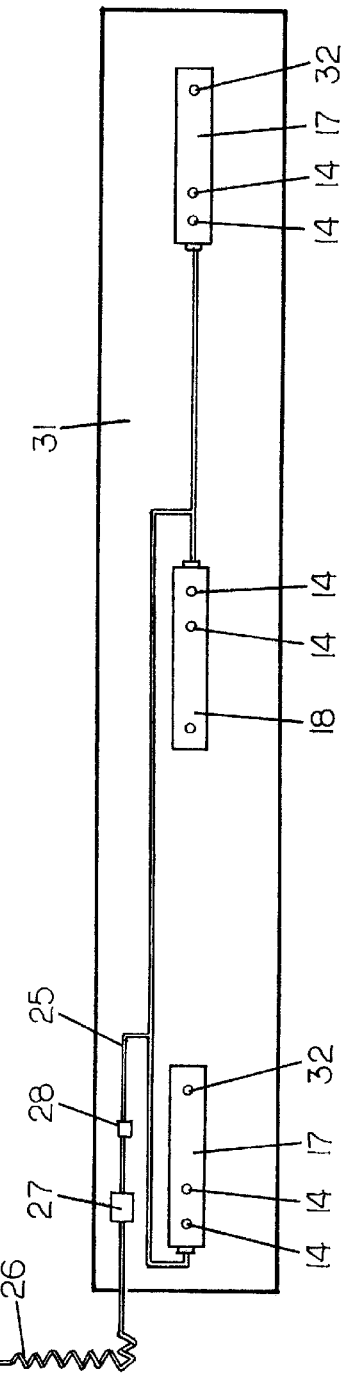
FIG. 6b is a top view of half of the partially assembled portable weigh scale system without the outer tubing subassembly according to a second preferred embodiment of the present invention.
Figure 7:
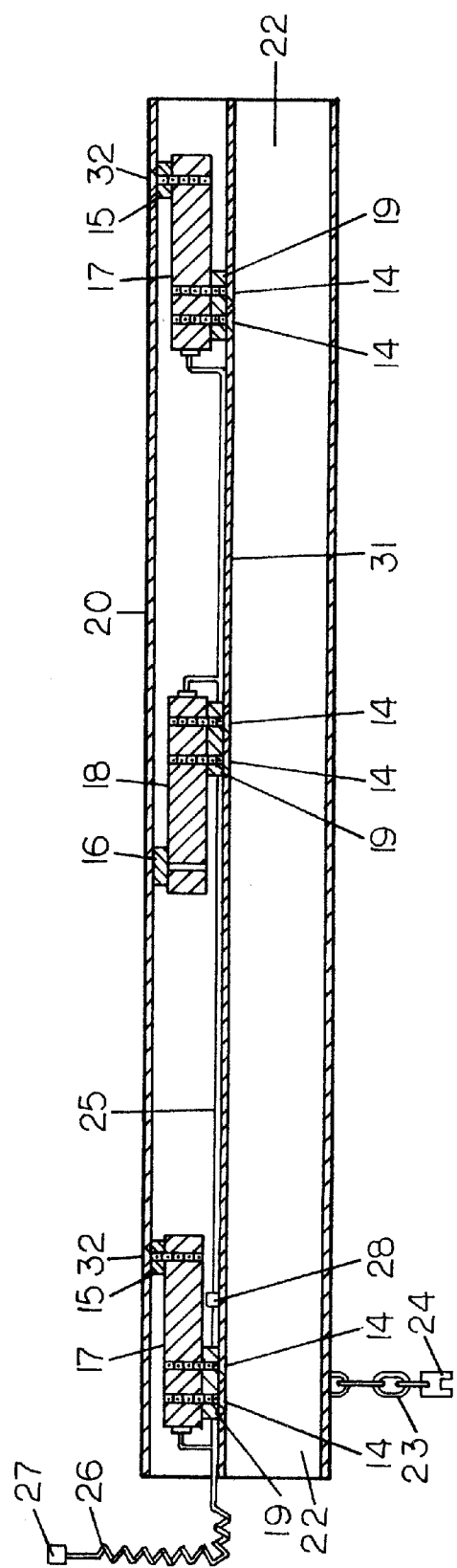
FIG. 7 is a full-length sectional view of half of the fully assembled portable weigh scale system taken along line 7—7 of FIG. 6a according to a second preferred embodiment of the present invention.
Figure 8:
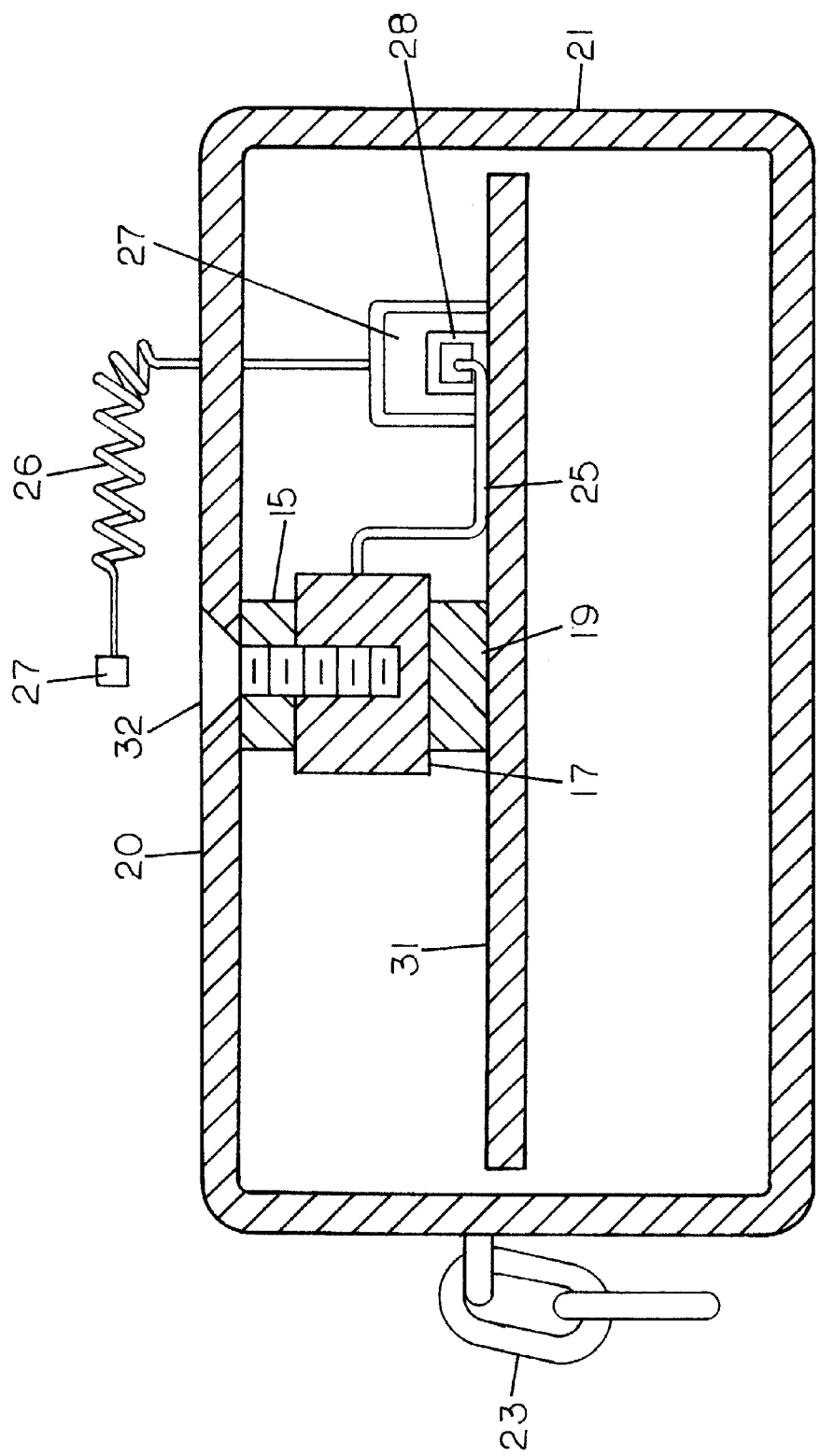
FIG. 8 is a full-width enlarged sectional view of half of the fully assembled portable weigh scale system taken along line 8—8 of FIG. 6a according to a second preferred embodiment of the present invention.
Figure 9:
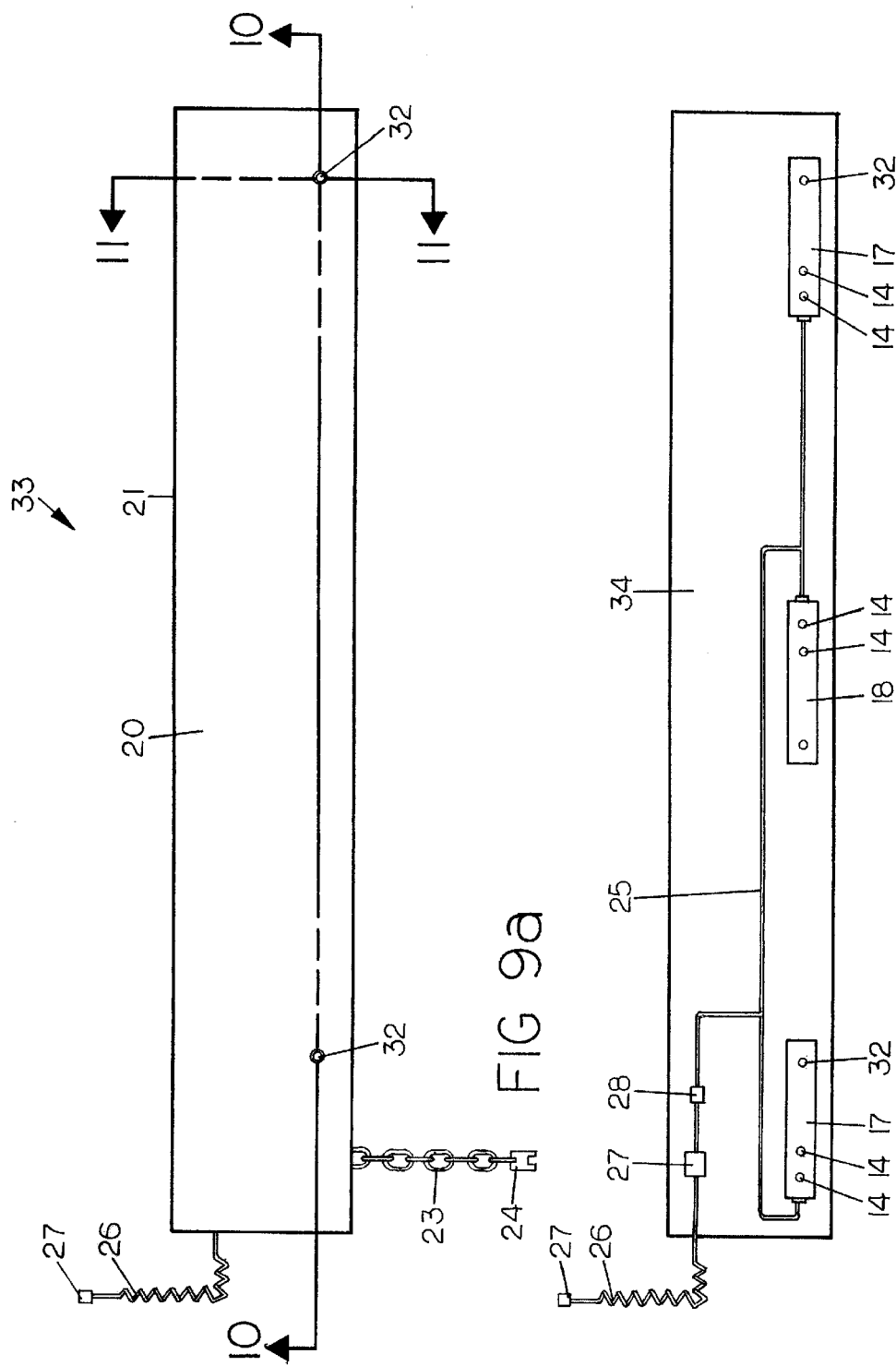
FIG. 9a is a top view of half of the fully assembled portable weigh scale system according to a third preferred embodiment of the present invention.
FIG. 9b is a top view of half of the partially assembled portable weigh scale system without the outer tubing subassembly according to a third preferred embodiment of the present invention.

Other configurations of the portable weigh scale system of the invention are also possible. FIGS. 6a–8 illustrate half of the said portable weigh scale system assembly 30 including common interconnect components 26, 27 and 28 according to a second preferred embodiment of the present invention that is comprised of two identical halves to form a pair. Each half of the said pair includes a formed metal tubing section 20 to which primary load sensing cells 17 are affixed by fasteners 32 through spacers 15 as illustrated in FIGS. 6b and 7. These primary load cells are further affixed to the top surface of a fabricated metal plate 31 by fasteners 14 through spacers 19. The auxiliary load sensing cell or cells 18 are not affixed but positioned against the upper inside surface of the fabricated metal tubing section 20 with spacer 16 that is affixed to each auxiliary load sensing cell. The auxiliary load sensing cell or cells is affixed to the fabricated metal plate 31 by fasteners 14 through spacers 19. Electrical connections between each half of the weigh scale system assembly 30 and a commercial electronic readout display mounted inside the fork lift truck or the like are the same as those for weigh scale system assembly 10. The fitting of weigh scale system assembly 30 to lift truck forks and its attachment to the fork lift truck or the like is the same as that described for weigh scale system assembly 10.

Lifting, weighing and transport functions of the above described assembly embodiment 30 of this invention illustrated in FIGS. 6a–8, are well suited to standard loads that are non-cylindrical. The longitudinal center mounting of primary load sensing cells 17 and auxiliary load sensing cells 18 to the fabricated metal plate 31 as illustrated in FIG. 6b optimize the proper support, weight dispersion and load weight reading accuracy of a standard non-cylindrical load. A load can be placed onto the top surface of metal tubing sections 20, or because of the low profile of weigh scale system assembly 30, the system can be easily fitted under a standard pallet to lift, weigh and transport a load. When the lift forks are raised, the top surface of the lift forks contacts the bottom surface of fabricated metal plates 31 and elastically bends the said primary and auxiliary load sensing cells upward. The operation and effect of the bending action of the said load cells and the resulting transmission of load weight data to a commercial electronic readout display is the same as that described for weigh scale system assembly 10. Vertical overload protection is achieved because the upward flexing of primary load sensing cells 17 and auxiliary load sensing cells 18 will bottom them out on the top surface of fabricated metal plates 31 preventing further flexing of all load sensing cells before they reach their operational load weight limit. This is accomplished by providing the correct spacing between all load sensing cells and the top surface of fabricated metal plates 31. Lateral overload protection is achieved because all load sensing cells are completely surrounded by metal tubing sections 20 preventing direct lateral impact between the said load sensing cells and another object. Potential binding within the said weigh scale system caused by the use of more than two load cells that could affect weight measurement accuracy is eliminated. This is accomplished by affixing only the primary load sensing cells 17 to the metal tubing sections 20 by means of fasteners 32 through spacers 15 as illustrated in FIG. 7. The auxiliary load sensing cells 18 are attached only to the top surface of fabricated metal plates 31 through spacers 19 as illustrated in FIG. 7.

Figure 10:
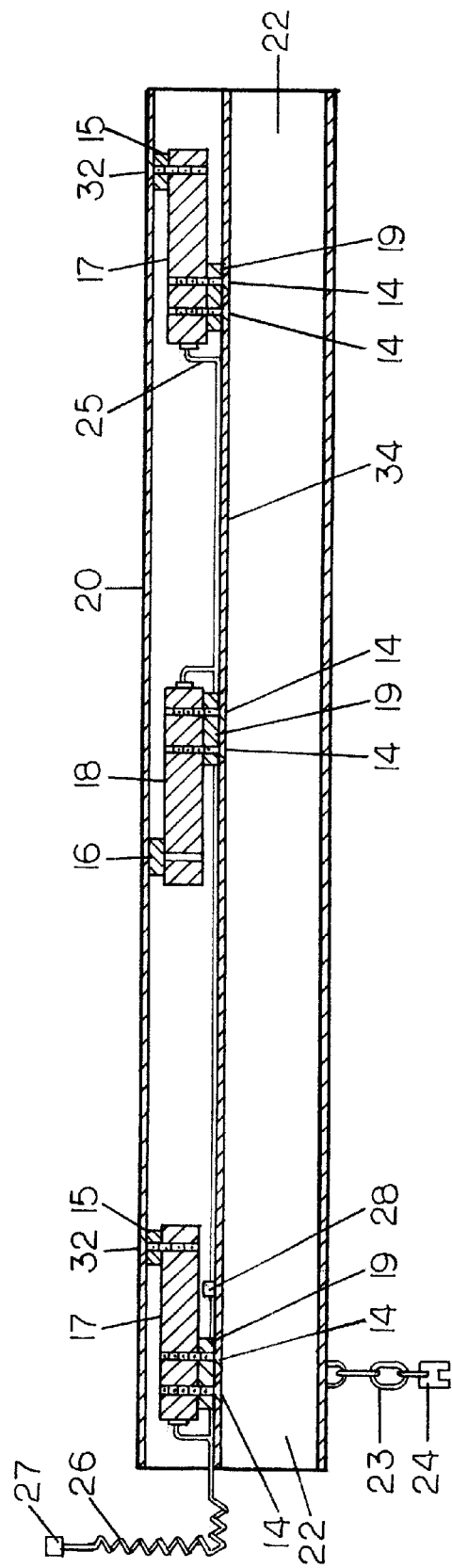
FIG. 10 is a full-length sectional view of half of the fully assembled portable weigh scale system taken along line 10—10 of FIG. 9a according to a third preferred embodiment of the present invention.
Figure 11:
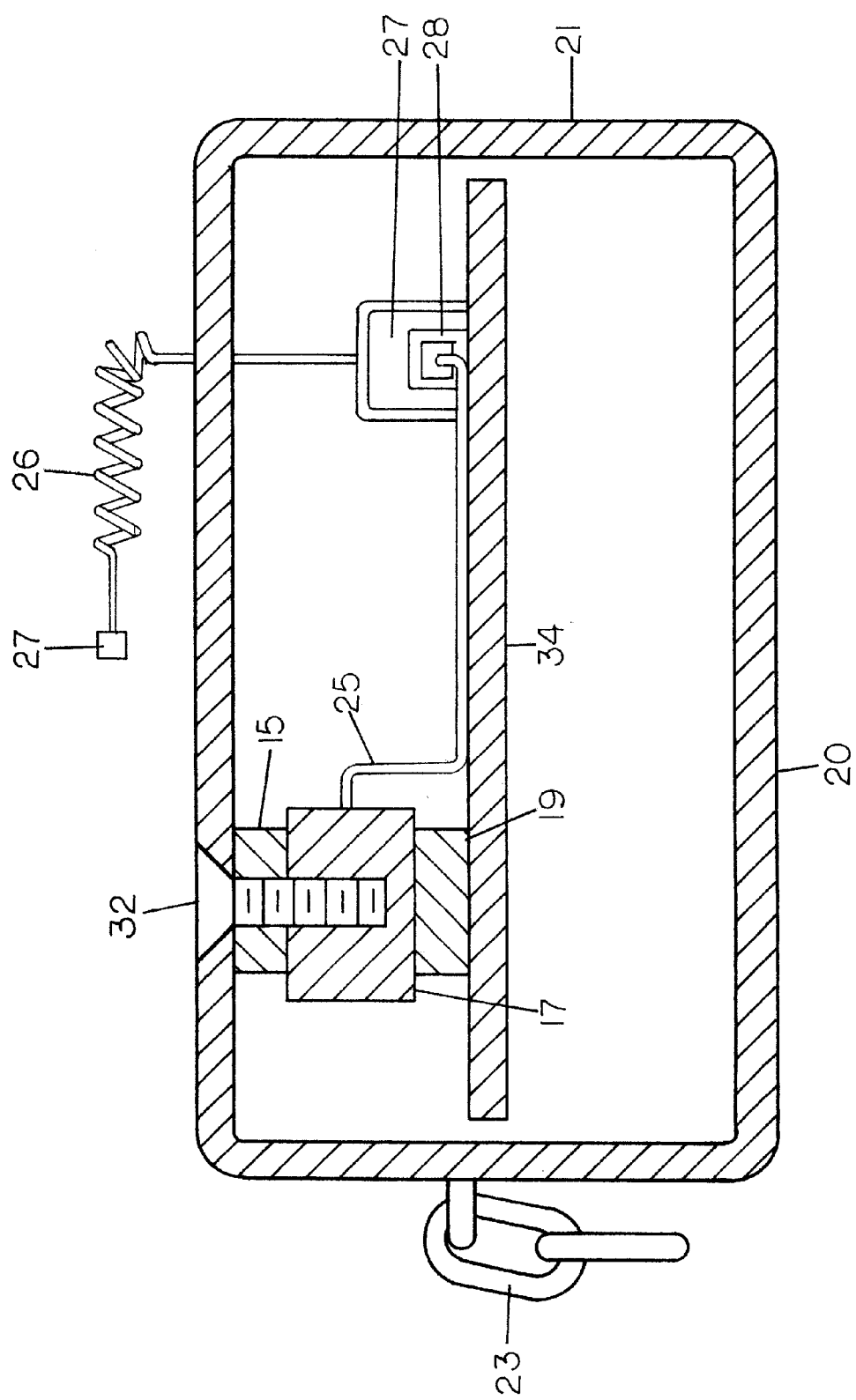
FIG. 11 is a full-width enlarged sectional view of half of the fully assembled portable weigh scale system taken along line 11—11 of FIG. 9a according to a third preferred embodiment of the present invention.

FIGS. 9a–11 illustrate half of the said portable weigh scale system assembly 33 including common interconnect components 26, 27 and 28 according to a third preferred embodiment of the present invention that is comprised of two identical halves to form a pair. General construction, electrical connections, mechanical operation, overload protection and avoidance of potential binding within weigh scale system embodiment 33 are the same as those for weigh scale system assembly 30. However, the primary load sensing cells 17 and auxiliary load sending cells 18 are fastened longitudinally along the outer edges of the top surface of fabricated metal plate 34 as illustrated in FIGS. 9b and 10 rather than being center mounted. This configuration of all load sensing cells makes the said weigh scale system well suited to the weighing of cylindrical loads such as flat sheet steel coil as well as standard transport, lifting and weighing functions with other load types. This load sensing cell configuration optimizes load sensing cell position relative to the weight center of a cylindrical load for load weight measurement accuracy. The low profile of the said weigh scale system also makes it well suited to typical required functions with standard loads that are non-cylindrical.

Figure 13:
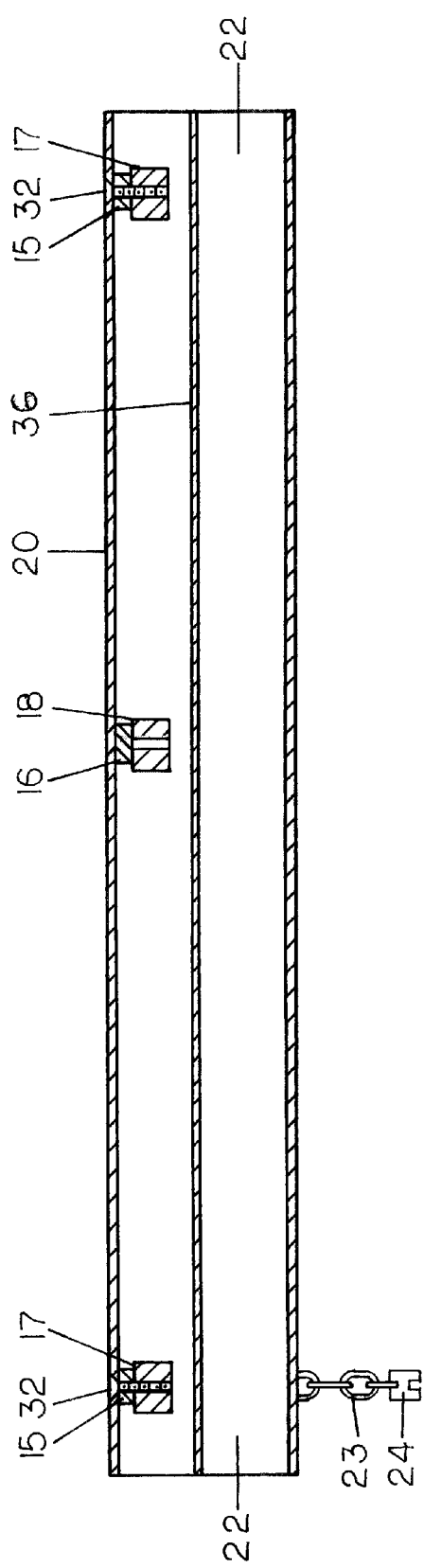
FIG. 13 is a full-length sectional view of half of the fully assembled portable weigh scale system taken along line 13—13 of FIG. 12a according to a fourth preferred embodiment of the present invention.
Figure 14:
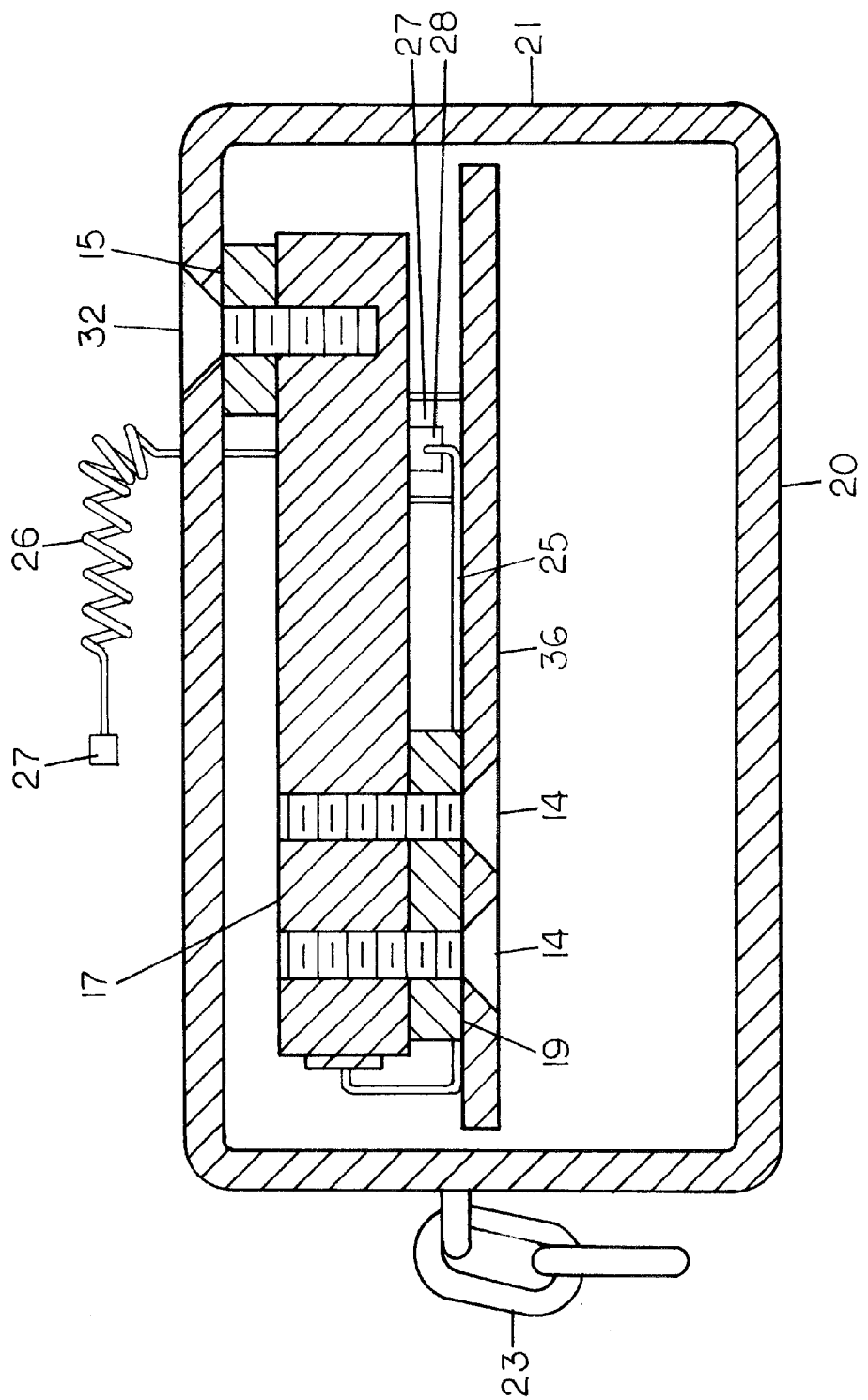
FIG. 14 is a full-width enlarged sectional view of half of the fully assembled portable weigh scale system taken along line 14—14 of FIG. 12a according to a fourth preferred embodiment of the present invention.

FIGS. 12a–14 illustrate half of the said portable weigh scale system assembly 35 including common interconnect components 26, 27 and 28 according to a fourth preferred embodiment of the present invention that is comprised of two identical halves to form a pair. General construction, electrical connections, mechanical operation, overload protection and avoidance of potential binding within weigh scale system embodiment 35 are the same as those for weigh scale systems 30 and 33. However, primary load sensing cells 17 and auxiliary load sensing cells 18 are fastened transversely to the top surface of fabricated metal plate 36 as illustrated in FIGS. 12b and 13 rather than being center or outer edge mounted. This configuration of all load sensing cells makes the said weigh scale system well suited to all of the same lifting, weighing and transport functions as those for weigh scale system assembly 33. This includes cylindrical loads because of the ability to place the flexing end of the load sensing cells very close to the weight center of such loads. Further, the spacing afforded by this configuration facilitates the maximum number of auxiliary load sensing cells to be fitted onto fabricated metal plate 36 for very high load weights.

What is claimed is:

1. A portable weigh scale system for lifting, weighing and transporting a load when said system is fitted to the forks of a lift truck vehicle in a simple slide-on manner, the said weigh scale system being configurable as various preferred embodiments for differing load applications, each said embodiment comprised of two identical halves to form a pair, each half of said pair comprising:

(a) a lower standard formed metal tubing section fitted over and around most of the horizontal length of the lift truck fork supporting said load;

(b) a fabricated metal plate or load bearing upper fabricated standard metal tubing section and cover assembly responsive to load weight;

(c) at least one primary load sensing cell and at least one auxiliary load sensing cell that are electrically interconnected and flex in response to a load being positioned on either the top surface of said upper fabricated standard metal tubing section and cover assembly or the top surface of said lower standard formed metal tubing section;

(d) a fastener attaching flexing end of said load cells either to underside of said upper fabricated standard metal tubing section and cover assembly or to the underside of the top surface of said lower standard formed metal tubing section;

(e) fasteners attaching non-flexing end of said load cells either to the top surface of said lower standard formed metal tubing section or to the top surface of said fabricated metal plate;

(f) spacers through which said fasteners align, positioning the top surface of the flexing end of said load cells relative to the underside of said fabricated cover or relative to the underside of the top surface of said lower standard formed metal tubing section and positioning the bottoms surface of the non-flexing end of said load cells relative to the top surface of said lower standard formed metal tubing section or relative to the top surface of said fabricated metal plate, said positioning allowing limited elastic bending of the flexing end of said load cells;

(g) a stretchable extension cable and end fittings that constitute a quick and easy electrical interconnect between the load bearing components of said weigh scale system and an electronic readout display suitably mounted inside said lift truck vehicle, the said stretchable extension cable being damage resistant if inadvertently pulled; and (h) a flexible line or chain and connecting bracket that constitute a quick and easy attachment means for connection of said weigh scale system to said lift truck vehicle.

2. A portable weigh scale system according to claim 1 wherein said system components are suitably compact in size and light in weight facilitating quick and easy fitting to and removal from said forks of said lift truck vehicle in a simple slide on/off manner.

3. A portable weigh scale system according to claim 1 wherein said positioning of said load cells by means of said spacers allows room for downward or upward bending action of flexing ends of said load cells to provide weight sensing capability when said load cell is subjected to load weight.

4. A portable weigh scale system according to claims 1 or 3 wherein the downward or upward flexing of said load cells will bottom them out on either the top surface of said lower standard formed metal tubing section or the top surface of said fabricated metal plate, thus providing vertical overload protection.

5. A portable weigh scale system according to claim 1 wherein said fabricated cover or lower standard metal tubing section surround said load sensing cells preventing direct lateral impact to said load cells with another object, thus providing lateral overload protection.

6. A portable weigh scale system according to claim 1 wherein the tips of said forks extend slightly past the ends of said weigh scale system and will laterally impact with another object before such an object can contact said weigh scale system, thus providing lateral overload protection from frontal impact.

7. A portable weigh scale system according to claim 1 wherein said system components are fitted directly to said forks of said lift truck vehicle and do not need modifications or additional attachment components such as a secondary carriage, thus maintaining proper relative position and balance between said weigh scale system and said lift truck vehicle and unobscured operator vision of a load for lifting, weighing and transport functions.

8. A portable weigh scale system according to claim 1 wherein the configurability of said weigh scale system as various preferred embodiments for differing load applications including flat sheet coil, facilitates superior centering of a load weight directly over said load sensing cells, thus optimizing load weight reading accuracy.

9. A portable weigh scale system according to claims 1 or 2 wherein said system is compact and light weight facilitating quick and easy conversion of said lift truck forks back and forth from standard lifting and transport functions to weigh scale functions in a simple slide on/off manner, thus expanding the effective range of application of unmodified lift truck vehicle forks.

10. A portable weigh scale system according to claim 1 wherein at least one of said preferred embodiments of said weigh scale system is low in profile, enhancing easy fitting of said system under a standard pallet to lift, weigh and transport a load.

11. A portable weigh scale system according to claim 1 wherein said auxiliary load sensing cells reinforce the structural integrity of said system preventing potential concave and convex deformation of the center section of said system, and augmenting the weighing capacity of said primary load cell or cells for heavier loads.

12. A portable weigh scale system according to claim 1 wherein said auxiliary load sensing cells are not affixed to the direct load bearing components of said system, thus eliminating load weight measurement errors resulting from the potential binding action caused by utilizing more than two load cells to sense load weight and transmit weight readings to said electronic display.

13. A portable weigh scale system according to claim 1 wherein said load sensing cells are electronically matched to further enhance the accuracy of weight measurement readings regardless of load type or the positioning of said load on said system.

* * * * *